Figure 1:
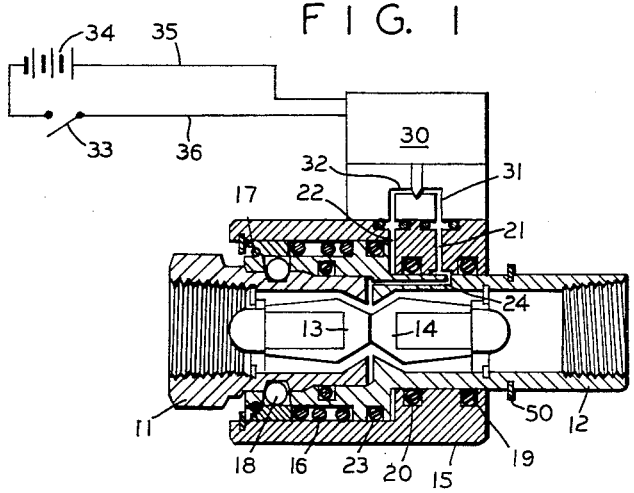

Jan. 19, 1960     E. M. CANNER     2,921,802
FLUID LINE COUPLING WITH REMOTE CONTROLLED
FLUID PRESSURE ACTUATED LATCH
Filed Feb. 11, 1957     2 Sheets-Sheet 1

*INVENTOR.*
EDWIN M. CANNER
BY
*Ervin B. Steinberg*
AGENT.

Jan. 19, 1960 E. M. CANNER 2,921,802
FLUID LINE COUPLING WITH REMOTE CONTROLLED
FLUID PRESSURE ACTUATED LATCH
Filed Feb. 11, 1957 2 Sheets-Sheet 2

EDWIN M. CANNER
*INVENTOR.*

BY *Ervin B. Steinberg*

AGENT.

2,921,802
Patented Jan. 19, 1960

United States Patent Office

2,921,802
FLUID LINE COUPLING WITH REMOTE CONTROLLED FLUID PRESSURE ACTUATED LATCH

Edwin M. Canner, West Hartford, Conn., assignor to Kahn and Company, Incorporated, Hartford, Conn., a corporation of Connecticut Application February 11, 1957, Serial No. 639,374

5 Claims. (Cl. 285—18)

This invention is related to couplings for fluid lines and is a continuation-in-part of my copending application for Letters Patent, Serial Number 561,027, filed January 24, 1956, entitled "Remote Controlled Coupling for Fluid Lines," now abandoned. It has particular reference to quick-connective couplings equipped with automatic shut-off means.

Couplings for fluid lines operating under pressures other than atmospheric pressure and embodying valve means acting automatically to close the line on one or both sides of the coupling when the coupling is broken and to open the line on one or both sides when the coupling is made are well known in the art.

In most couplings of this design a mechanical sleeve or other elements must be moved in order to establish engagement of the coupling halves or cause disengagement therebetween. This motion is usually accomplished manually.

The advent of modern aircraft engines has shown the need for such a coupling which can be disconnected by remote control. Many of the new aircraft engines require starting from an external source of high pressure air. These engines, particularly when mounted in interceptor aircraft, must be ready not only for instant starting but the aircraft still further must be ready for instant take-off. Since the aircraft although manned, may be independent of ground maintenance crews and as the aircraft may be located a mile or more from the hangers, a means is desired for disconnecting the aircraft from the source of fluid pressure by remote control.

The use of mechanical releases, involving cables, flexible shafts, levers, etc., are well known. These means are however not desirable because usually only one coupling at a time may be actuated. In multi-engine aircraft, disconnecting of couplings one at a time is a time consuming operation and burdens the pilot or crew member who is working at full capacity at the very moment when every second is of greatest significance. Still further decoupling initiated by excessive mechanical stress presents safety hazards because it may upset the stabilizing forces of aircraft and moreover as it is not known whether the connection is broken until the aircraft has actually started to leave its take-off position.

One of the objects of this invention therefore is to provide a coupling which avoids one or more of the disadvantages of prior art arrangements.

Another object of this invention is the provision of a fluid coupling which can be disconnected in response to the operation of a remote control circuit.

Another object of this invention is to provide a coupling which presents a minimum of safety hazards.

Another object of this invention is the provision of a mechanism in which a plurality of fluid couplings can be disconnected by a single control operation.

Another and further object of this invention is the provision of a fluid coupling which is disconnected by moving a sliding member under the influence of fluid power means which are controlled from a remote location.

Another and further object of this invention is the provision of a fluid valve integrally connected to said coupling.

Still another object of this invention is the provision of a fluid coupling with a remotely controlled fluid valve disposed on the coupling.

Another and still further object of this invention is the provision of a fluid coupling which is disconnected without time delay and without regard to the mechanical skill and ability of an attendant or operator.

Figure 2:
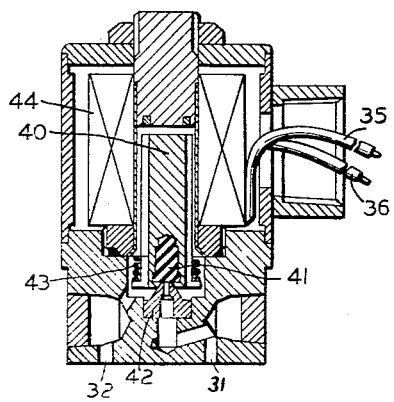
Figure 3:
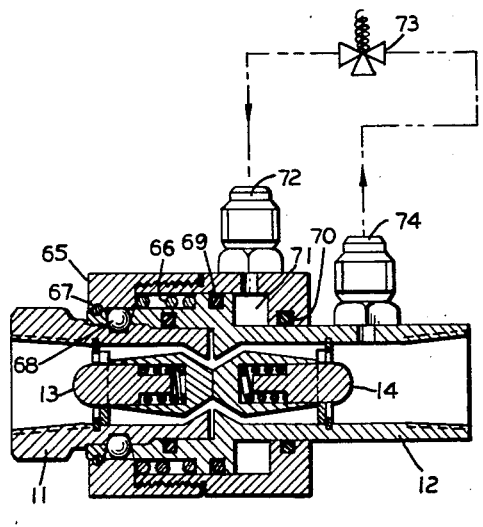

Further and other features of this invention will become apparent by reference to the following description taken in connection with the accompanying drawings in which:

Figure 1 is a cross-sectional view (partly schematic) of the fluid coupling including the control circuit, Figure 2 is a cross-sectional view through a typical solenoid controlled fluid valve shown schematically in Figure 1, and Figure 3 is a cross sectional view, partly schematic, of an alternate embodiment of the fluid coupling substantially as shown in my co-pending application for Letters Patent referenced above.

Referring now to Figure 1, a valved coupling for fluid lines is illustrated substantially as shown and described in U.S. Patent 2,548,528 to F. E. Hansen, issued April 10, 1951, entitled "Valved Hose Coupling." Such couplings are well known in the art and essentially comprise a plug member 11 and a socket member 12 adapted to engage one another. Each of said members is equipped with an internal valve mechanism 13 and 14 respectively (shown only schematically) which acts automatically to close either side of the line when the coupling is broken and to open the line on both sides when the coupling is made. The details of this mechanism and related elements have been omitted as they are well known and may be inspected by reference to the above identified patent. Similar couplings are illustrated also in a reference table entitled "Quick Disconnect and Self-Sealing Couplings for Fluid Applications," Product Engineering Magazine, December 1955, pages 168 and 169.

The instant coupling includes also a slidable, annular sleeve 15 which is resiliently biased toward the left by a helical compression spring 16. When the sleeve 15 is moved toward the right, against the compression spring 16, the sleeve frees split ring 17 and steel ball 18 lifts out of its seat to cause disengagement of the coupling halves.

In the instant design, the annular sleeve 15 is provided with two radial fluid passage paths 21 and 22 which are sealed from the ambient by annular O-ring gaskets 19, 20 and 23. It will be observed that radial path 22 is placed in such a manner that it coincides with a parting surface between sleeve 15 and socket member 12. Radial path 21 is continued in socket 12 by a longitudinal path 24 which terminates at the parting surface between both coupling halves. It should be noted further that this surface is in communication with the fluid flow through the coupling when the coupling members are engaged, but in contact with ambient when the members are disengaged from one another.

Numeral 30 identifies a solenoid operated fluid valve which has an entrance and an exit port, numerals 31 and 32 respectively, which are in communication with the radial paths 21 and 22 of the sleeve. O-ring gaskets are employed to effect sealing of the respective paths to one another and against ambient. The solenoid valve is operated by means of a circuit switch 33 and source of electrical power 34 connected via conductors 35 and 36 to the valve 30.

The actual construction of the solenoid valve is indicated in greater detail in Figure 2. The movable plunger with rubber insert 41 is held against valve seat 42 by a spring 43 thereby sealing port 31 from port 32. When energizing solenoid coil 44 with electrical energy, the plunger becomes raised thereby permitting fluid communication between ports 31 and 32. The detailed construction and design of this type of valve is well known in the art and valves of varying designs could be used for the instant application.

The operation of this device may be visualized as follows: When the coupling halves are engaged, fluid flows between the plug and socket members, for instance high pressure air ranging from 500 to 3000 p.s.i. Since longitudinal path 24 is arranged to be in communication with this fluid flow, path 24 becomes pressurized as well as radial path 21 and port 31 of the valve, all communicating with one another. Now, when the pilot of the aircraft for instance, operates switch 33, plunger 40 is raised, permitting pressure to enter port 32 and path 22, the latter forming at its lower termination a fluid chamber adapted to become pressurized. The pressure build-up in this chamber causes the sleeve to be driven toward the right until its motion becomes stopped by stop 50. In moving to the right, the coupling socket and plug members become disengaged and the internal fluid flow is shut off. By virtue of the longitudinal path 24 now being exposed to ambient, the paths are vented, the pressure relieved, and the sleeve is automatically returned to its starting position at the left by the force of spring 16. After opening the switch 33, the coupling is ready to be used again by manually engaging the plug and socket members with one another.

Figure 3 is a further embodiment of the design employing a remotely located fluid control valve. The coupling again comprises a plug member 11 and a socket member 12 adapted to engage one another. Each of said members is equipped with a valve mechanism 13 and 14 respectively which acts automatically to close either side of the line when the coupling is broken and to open the line on both sides when the coupling is made. The details of this mechanism and related elements have been omitted as they are well known and may be inspected by reference to the above identified Hansen patent.

The coupling includes also a slidable, annular sleeve 65 (made for the sake of assembling convenience of two threaded halves) which is resiliently biased toward the left by a helical compression spring 66. When the sleeve 65 is moved toward the right, against the force of compression spring 66, the sleeve frees split ring 67 and steel ball 68 lifts out of its seat to cause disconnecting of the coupling halves.

In the instant design, the annular sleeve has been provided with two O-ring gaskets 69 and 70 to provide a sealed annular chamber 71 which can be pressurized with a fluid entering through fitting 72.

When pressurizing this chamber 71, sleeve 65 is urged in motion toward the right thus causing disengagement of coupling members 11 and 12. Pressurizing of chamber 71 with fluid may be accomplished in various ways as for instance by an outside source of pressure and a three way control valve (depicted here as an electrically operated valve) or by employing the fluid pressure within the fluid line and establishing connection from the interior of socket member 12 via fitting 74 and connecting line to valve 73. The left member 11, is the part which remains with the aircraft or similar vehicle.

In actual operation, when the operator wishes to release the hose, he will press a push button switch which actuates valve 73 and the high pressure air, ranging from 500 to 3000 p.s.i. will be admitted from fitting 74 to fitting 72, causing the sleeve to retract toward the right. This will permit the ball 68 to rise out of its seat and the resulting pressure forces, together with gravity, will cause the coupling to disconnect. When the operator removes his hand from the switch, the air from chamber 71 will be vented to the atmosphere and the sleeve 65 returned to its normal position.

As a modification, a small bleed hole may be provided in sleeve 65 communicating between the chamber 71 and the outside. This bleed hole arrangement will permit the use of a two-way valve. In operation, when the valve 73 is released after actuation, the fluid from fitting 74 to fitting 72 is shut off and any air trapped is bled to atmosphere. This modification has the advantage of a more simple and lighter solenoid valve, but provisions must be made that the bleed hole be not blocked by dirt or ice.

It will be apparent that the instant coupling provides features which contribute to safety, speed and convenience. As many aircraft in constant readiness for operations are subjected to a variety of environmental conditions, such as ice, sleet, winds, driving rains, dust, etc., manually operated couplings involve potential hazards to personnel and ease of operation. The design disclosed herein eliminates these disadvantages and provides positive disengagement action.

While there has been described and disclosed certain preferred embodiments of the invention, it will be apparent to those skilled in the art that various changes and modifications may be made therein without departing from the spirit and intent of the invention which should be limited only by the scope of the appended claims.

What is claimed is:

1. A remote controlled coupling for fluid lines comprising; a plug member and a socket member adapted to engage one another and establish fluid flow therebetween; a slidable annular sleeve supported on said socket member and adapted to cause locking engagement of said members when engaged with one another and when the sleeve is retained in a first direction, and to cause disengagement of said members when said sleeve is moved in the opposite direction; spring means biasing said sleeve in the first direction; a solenoid actuated two-way fluid valve supported on said sleeve and moving in unison therewith; one portion of a fluid passage path disposed to extend from said valve through said sleeve and through said socket member for communication with the fluid flow between said socket and plug members; the other portion of said fluid passage path disposed to extend from said valve through said sleeve and terminating in a fluid chamber which is formed by a portion of said sleeve and a portion of said socket member; an electrical control circuit for causing actuation of said solenoid valve thereby producing a pressure in said chamber as a result of fluid flow through said paths and said pressure causing said sleeve to move against the force exerted by said spring means.

2. A remote controlled coupling for fluid lines comprising; a plug member and a socket member adapted to engage one another and establish fluid flow therebetween; a slidable annular sleeve supported on said socket member and adapted to cause locking engagement of said members when engaged with one another and when the sleeve is retained in a first direction, and to cause disengagement of said members when the sleeve is moved in the opposite direction; spring means biasing said sleeve in the first direction; a remote actuated two-way fluid valve supported on said sleeve and moving in unison therewith; a first fluid passage path disposed to extend from said valve through said sleeve and through said socket member for communication with the fluid flow between said socket and plug members; a second fluid passage path disposed to extend from said valve through said sleeve and terminating in a fluid chamber which is formed by a portion of said sleeve and a portion of said socket member; a control circuit for causing actuation of said valve thereby producing a pressure in said chamber as a result of fluid flow through said paths and said pressure causing said sleeve to move against the force exerted by said spring means, and said first fluid passage path terminating with one end at a surface portion of said socket member which is exposed to ambient pressure when said plug and socket members are disengaged and which is exposed to the fluid flow between said members when said members are engaged with another.

3. A remote controlled coupling for fluid lines comprising: a plug and a socket member adapted to engage one another and establish fluid flow therebetween; a slidable sleeve mounted on one of said members; locking means cooperating with said plug and socket members and said sleeve to maintain said plug and socket members when engaged in fluid conducting condition while said sleeve is maintained in a first position relative to said members; a resilient means biasing said sleeve toward said first position; a portion of said sleeve forming with a portion of one of said members a chamber which is adapted to become pressurized with fluid; fluid conducting means coupled to said sleeve at one end and communicating also with said chamber to cause pressurization thereof thereby urging said sleeve to move against the force exerted by said resilient means out of said first position toward a second position to cause disengagement of said plug and socket members, control means for controlling the pressure passing through said fluid conducting means into said chamber, and the other end of said fluid conducting means connected to said one member in communication with the fluid flow between said plug and socket members.

4. A remote controlled coupling for fluid lines comprising: a plug and a socket member adapted to engage one another and establish fluid flow therebetween; a slidable sleeve mounted on one of said members; locking means cooperating with said plug and socket members and said sleeve to maintain said plug and socket members when engaged in fluid conducting condition while said sleeve is maintained in a first position relative to said members; resilient means biasing said sleeve toward said first position; a portion of said sleeve forming with a portion of one of said members a chamber which is adapted to become pressurized with fluid; fluid conducting means coupled to said sleeve at one end and communicating also with said chamber to cause pressurization thereof thereby urging said sleeve to move against the force exerted by said resilient means out of said first position toward a second position to cause disengagement of said plug and socket members, control means disposed on said coupling for controlling the pressure passing through said fluid conducting means into said chamber, and the other end of said fluid conducting means connected to said one member in communication with the fluid flow between said plug and socket members.

5. A remote controlled coupling for fluid lines comprising: a plug and a socket member adapted to engage one another and establish fluid flow therebetween; a slidable sleeve mounted on one of said members; locking means cooperating with said plug and socket members and said sleeve to maintain said plug and socket members when engaged in fluid conducting condition while said sleeve is maintained in a first position relative to said members; resilient means biasing said sleeve toward said first position; a portion of said sleeve forming with a portion of one of said members a chamber which is adapted to become pressurized with fluid; fluid conducting means coupled to said sleeve at one end and communicating also with said chamber to cause pressurization thereof thereby urging said sleeve to move against the force exerted by said resilient means out of said first position toward a second position to cause disengagement of said plug and socket members, remotely actuated control means disposed on said sleeve for controlling the pressure passing through said fluid conducting means into said chamber, and the other end of said fluid conducting means connected to said one member in communication with the fluid flow between said plug and socket members.

References Cited in the file of this patent

UNITED STATES PATENTS

| | | |
|---|---|---|
| 2,433,119 | Hansen | Dec. 23, 1947 |
| 2,548,528 | Hansen | Apr. 10, 1951 |
| 2,593,491 | Saunders et al. | Apr. 22, 1952 |
| 2,595,211 | Le Clair | Apr. 29, 1952 |
| 2,643,140 | Scheiwer | June 23, 1953 |
| 2,698,185 | Sloan | Dec. 28, 1954 |
| 2,705,159 | Pfau | Mar. 29, 1955 |
| 2,752,801 | Olson | July 3, 1956 |
| 2,782,044 | Gabriel et al. | Feb. 19, 1957 |